United States Patent [19]

Hoffman et al.

[11] Patent Number: 5,353,378
[45] Date of Patent: Oct. 4, 1994

[54] SOUND AND LIGHT EMITTING FACE APPAREL

[75] Inventors: Donald L. Hoffman, Wynnewood; Neil M. Cohen, Lafayette Hill, both of Pa.

[73] Assignee: Hilco Corporation, Norristown, Pa.

[21] Appl. No.: 48,624

[22] Filed: Apr. 16, 1993

[51] Int. Cl.⁵ .................................................. G10L 3/00
[52] U.S. Cl. .................................. 395/2.81; 395/2.67
[58] Field of Search ................ 351/158, 41; 446/27; 362/103; 395/2.79, 2.85, 2.67, 2.81; 381/48, 51, 44

[56] References Cited

U.S. PATENT DOCUMENTS

| | | | |
|---|---|---|---|
| D. 201,050 | 5/1965 | Gieseking et al. | 351/158 |
| D. 207,919 | 6/1967 | Fai | 351/158 |
| D. 212,863 | 12/1968 | Roberts | 351/158 |
| 2,613,282 | 10/1952 | Scaife | 351/158 |
| 2,724,769 | 11/1955 | D'Arbeloff | 446/27 |
| 2,725,462 | 11/1955 | Vorgang | 362/103 |
| 3,369,228 | 2/1968 | Foster | 351/158 |
| 4,117,265 | 9/1978 | Gerlach | 381/48 |
| 4,254,451 | 3/1981 | Cochran, Jr. | 351/41 |
| 4,283,127 | 8/1981 | Rosenwinkel et al. | 351/158 |
| 4,326,710 | 4/1982 | Breslow et al. | 381/51 |
| 4,400,591 | 8/1983 | Jennings et al. | 446/27 |
| 4,596,032 | 6/1986 | Sakurai | 395/2.67 |
| 4,683,588 | 7/1987 | Goldberg | 446/27 |
| 4,690,653 | 9/1987 | Goldberg | 446/27 |
| 4,809,335 | 2/1989 | Rumsey | 395/2.81 |
| 4,822,160 | 4/1989 | Tsai | 351/41 |
| 4,822,161 | 4/1989 | Jimmy | 351/41 |
| 4,970,659 | 3/1990 | Breedlove et al. | 395/2.67 |
| 5,075,970 | 12/1991 | Albert | 30/123 |
| 5,145,447 | 9/1992 | Goldfarb | 446/397 |
| 5,224,772 | 7/1993 | Fustos | 362/105 |

FOREIGN PATENT DOCUMENTS 976520  8/1964  United Kingdom ............... 446/27

Primary Examiner—David D. Knepper
Attorney, Agent, or Firm—Seidel, Gonda, Lavorgna & Monaco

[57] ABSTRACT

A sound-emitting face apparel includes electronic storage, selection and retrieval of sound signals. The signals, such as music or speech sounds, are emitted outward from a central region of a wearer's face. The music and speech sounds are prestored on integrated circuit semiconductor chips. Blinking lights may be activated in conjunction with the emission of music. The face apparel can be eyewear wherein the sound is emitted from a bridge region of the eyewear's frame.

17 Claims, 3 Drawing Sheets

SOUND AND LIGHT EMITTING FACE APPAREL

FIELD OF THE INVENTION

This invention relates to a novelty apparel to be worn on the face of a person and which contains a sound storage, selection and emitting feature and a light emitting feature. The invention is described in the context of, but is not limited to, sound and light emitting eyewear wherein the sound is directed outward from a bridge region of the eyewear.

BACKGROUND AND OBJECT OF THE INVENTION

Sound and light emitting devices are known in the art. Typically, such devices include radios and light organs (i.e., light boxes which flash with the beat of the music). Furthermore, sound emitting devices employing preprogrammed integrated circuit chips are known in the art. See, for example, U.S. Pat. Nos. 4,809,335, 4,970,659 and 5,075,970.

Heretofore, it has not been known to integrally combine a face apparel item with sound and light emitting features.

One object of this invention is to create a novelty apparel item to be worn on the face of a user which will attract the attention of persons nearby by projecting selected pre-stored music and voice signals outward from the apparel.

Another object of this invention is to create a sound emitting face apparel item which additionally includes a light emitting feature to further enhance the attention-getting and novelty effects of the apparel.

These objectives are accomplished by the following apparel.

SUMMARY OF THE INVENTION

The present invention defines a sound-emitting apparel to be worn on the face of a user. The apparel comprises means for storing and retrieving sound signals, actuation means for selecting an individual sound signal, and speaker means. The selected sound signal is retrieved from the means for storing and retrieving upon selection thereof. The speaker means is disposed on the apparel so as to be located in a central region of the user's face upon wearing the apparel. The speaker means emits the selected sound signal outward from the face apparel.

In another embodiment, the invention defines sound-emitting eyewear which comprise an eyewear frame, two temples attached to either sides of the frame, a bridge region, means for storing and retrieving sound signals, actuation means attached to the frame for selecting an individual sound signal, and speaker means attached to the bridge region. The selected sound signal is retrieved from the means for storing and retrieving upon selection thereof. The speaker means emits the selected sound signals outward from the eyewear. The means for storing and retrieving is attached to the frame.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE PREFERRED EMBODIMENT

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
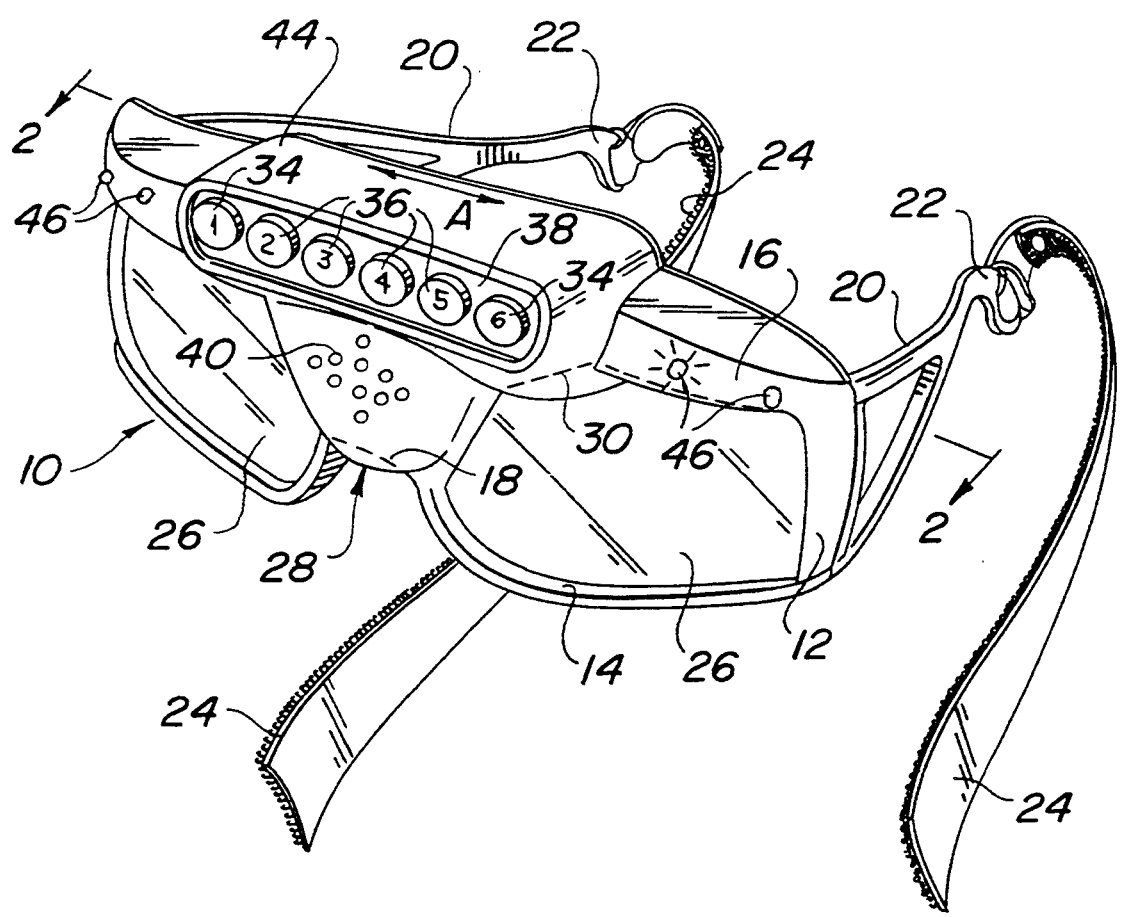
FIG. 1 a front perspective view of a sound and light emitting face apparel in file form of eyewear according to the invention.

Referring now to the drawings, wherein like numerals indicate like elements, there is shown in FIG. 1 a sound and light emitting face apparel in the form of eyewear 10. The eyewear 10 is defined by frame 12 which includes a rim portion 14, an upper portion 16, bridge 18 and temples 20. The temples 20 are hingedly attached to the outer left and right edges of the frame 12. Each temple 20 has an earpiece 22 at its far end for securing the eyewear 10 to a wearer's head. Optional straps 24 are connected to the earpieces 22. These straps 24 can be wrapped around the back of the wearer's head so as to further secure the eyewear to the wearer's head and to allow the eyewear 10 to hang loose around the wearer's neck when not affixed to the wearer's face. The left and right straps 24 contain respective portions of hook and pile-type fastening material such as VELCRO®. The eyewear 10 is defined as having a main axis A.

The eyewear 10 also includes lenses 26. Lenses 26 can be either clear or corrective (e.g., distance, reading). Additionally, the lenses 26 can be tinted for use as sunglasses. The structural support element(s) located in the spacing between the lenses 26 is known in the art as a bridge. The bridge 18 of eyewear 10 is shown in phantom (by a dotted line) because it is not visible from the depicted angle. The bridge 18 is more clearly shown in FIG. 2. The area surrounding the top of the bridge 18 is defined herein as a bridge region 28. The bridge region 28 also coincides with a central region of a wearer's face. The sound storage, selection and emitting features are attached to the frame 12 along the upper edge of bridge 18 and the upper edge of the frame 12, above and immediately adjacent to lenses 26. The upper edge of the frame 12 is labelled in phantom on one side as dotted line 30. Upper portion 16 of the frame 12 (e.g., the portion above lenses 26) contains the light emitting feature. The light emitting feature may be either built into the frame 12 or may fixedly attached thereto.

Figure 2:
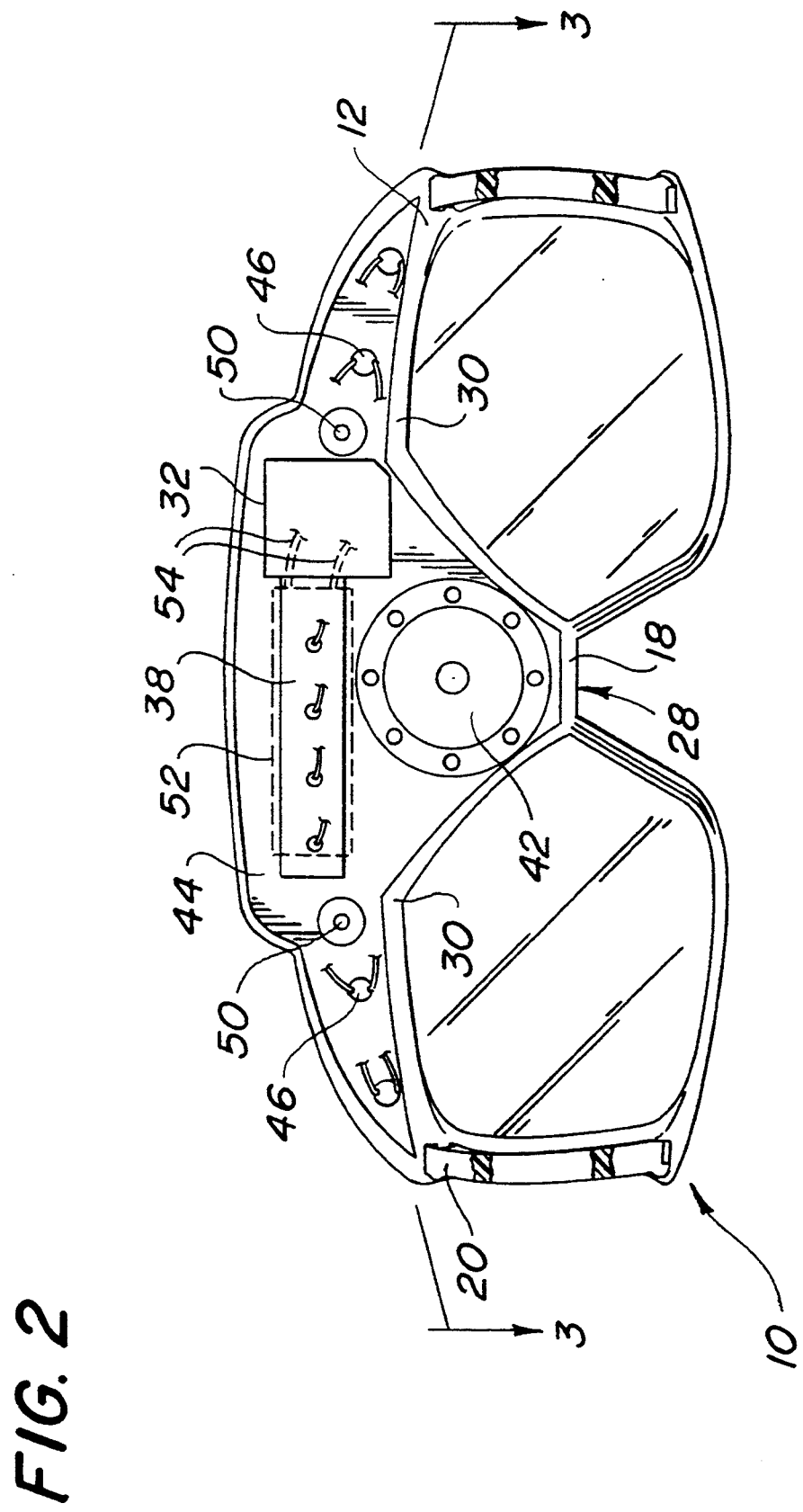
FIG. 2 is a rear perspective view of the sound and light emitting apparel taken along lines 2—2 in FIG. 1.

The sound storage, selection and emitting feature includes one or more integrated circuit (IC) semiconductor chips 32 (shown in FIGS. 2 and 3 and described below) for storing and retrieving speech-synthesized voice sounds and music sounds, selection buttons 34 and 36 mounted on panel 38. and speaker holes 40 for projecting the sound from speaker 42 which is disposed immediately behind the speaker holes 40, as shown in FIG. 2. The selection buttons 34 and 36, and the speaker 42 are encased within protective housing 44. The buttons 34 and 36 are disposed on the outside of the housing 44 so as to be readily accessible to the wearer or to another person standing in front of the wearer.

In the preferred embodiment, selection buttons 34, which include buttons 1 and 6, allow for selection of music passages. Selection buttons 36, which include buttons 2-5, allow for the selection of voice or speech passages. In operation, momentary depression of button 1 will cause a short burst of music (e.g., about 10 seconds) to be played. Momentary depression of buttons 2-5 will cause a short voice or speech recording to be played. Momentary depression of button 6 will cause music to play continuously. A subsequent momentary depression of the button 6 will cause the music to stop. In other words, button 6 allows for the music to be toggled on and off. In contrast, depression of buttons 1-5 during the short period of time in which the music or voice is played will have no effect (e.g., it will not stop the playing).

An important feature of the invention is the placement of speaker 42 on the frame 12. The speaker 42 must be placed in the front of the eyewear 10 and must face forward. Placement of the speaker 42 on the temple 20 or earpiece 22 portion of the eyewear 10 will be harmful to the wearer due to the volume of the emitted sound. In the preferred embodiment, the speaker 42 is placed in the bridge region 28. In this manner, the speaker 42 directly projects the emitted sound outward (perpendicular to the main axis A of the eyewear 10) and towards another person, thereby enhancing the novelty aspect of the invention by allowing the wearer of the eyewear 10 to surprise and entertain persons near them.

Another important feature of the invention is lights 46. As noted above, these lights are disposed on the upper portion 16 of the frame 12 and may be either built into the frame 12 or may fixedly attached thereto. In the preferred embodiment, four lights 46 are employed, two above each lens 26. The lights 46 are preferably light emitting diodes (LEDs). In operation, the lights flash at a preselected rate when the music plays. The lights do not operate during play of voice or speech passages. The lights further enhance the novelty aspect of the invention.

FIG. 2 shows a rear perspective view of eyewear 10 taken along lines 2—2 in FIG. 1. A back panel 48 (shown in FIG. 3) of the housing 44 has been removed so as to show the inner parts of the sound storage, selection and emitting feature and the light emitting feature. The back panel 48 attaches to the housing 44 by screws threaded through screw holes 50 protruding inward (towards the wearer's face) from housing 44. In this view, bridge 18 and upper edges 30 of frame 12 are clearly visible.

FIG. 2 also shows speaker 42 mounted in bridge region 28, LEDs 46, IC chip 32, and the back of panel 38 with music and/or voice buttons projecting therefrom (only four shown in this view). Also visible in FIG. 2 are temples 20 which project backward from the front of the eyewear 10. The sound storage, selection and emitting feature and the light emitting feature are powered by a low-voltage battery 52 or batteries suitable for IC chip operation. The battery 52 or batteries are placed in a recess (not shown) through the back panel 48 and connected by lead wires 54 to the IC chip 32. The speaker 42 is powered either directly by the IC chip 32, or optionally by an IC amplifier chip (not shown).

Figure 3:
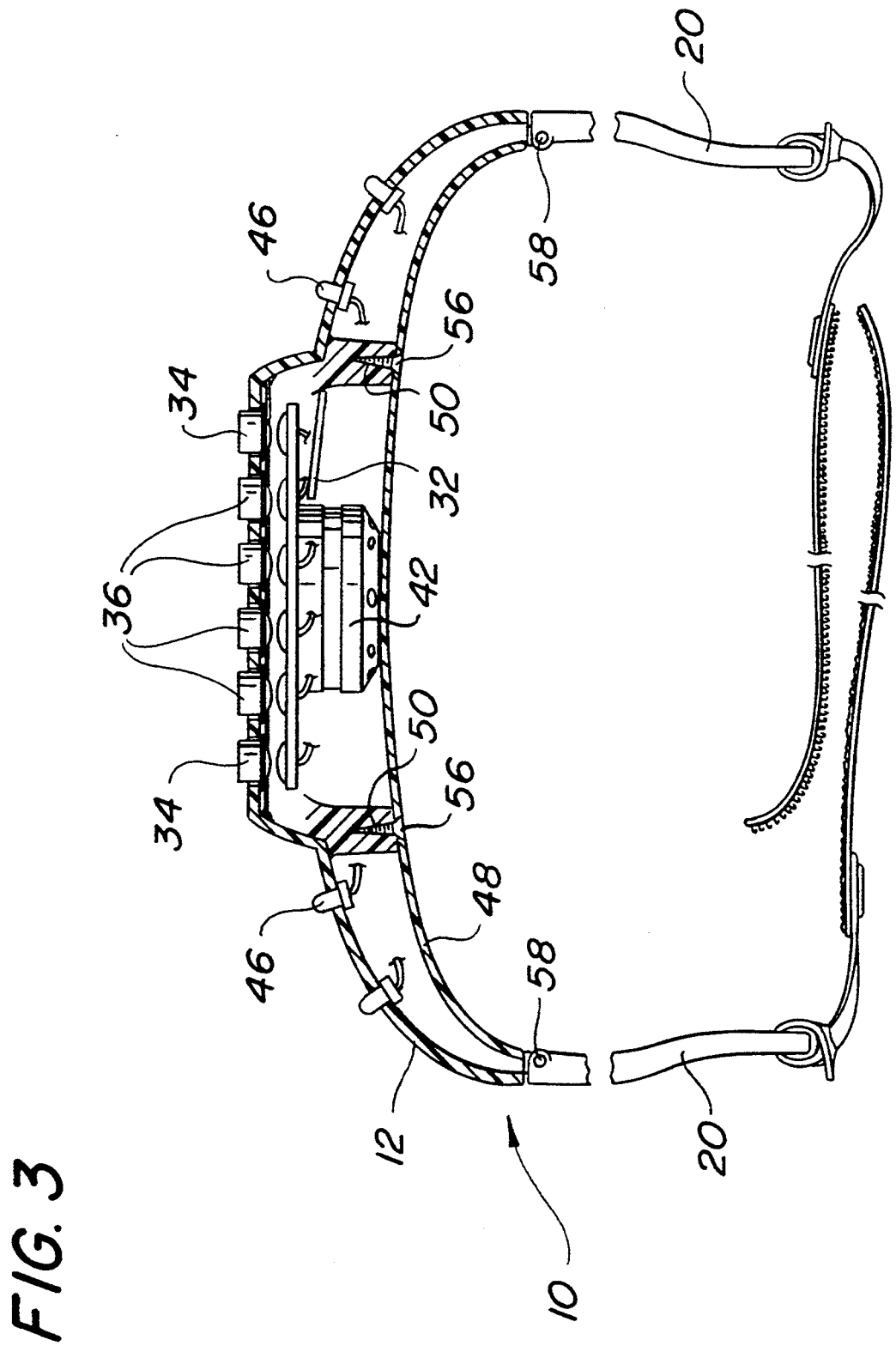
FIG. 3 is a sectional view of the sound and light emitting apparel taken along lines 3—3 in FIG. 2.

FIG. 3 shows a sectional view of eyewear 10 taken along lines 3—3 in FIG. 2. Back panel 48 is screwed into screw holes 50 by screws 56. Visible in this view are sound storage, selection and emitting features and the light emitting features including speaker 42, IC chip 32, selection buttons 34 and 36, and LEDs 46. Also visible in this view are hinges 58 for hingedly attaching the temples 20 to the outer left and right edges of the frame 12.

The depicted embodiment shows a single IC chip 32. However, plural IC chips can be employed to perform the functions described above. For example, one chip may store and emit music sounds, while another chip may store and emit voice sounds. The particular details of the IC chip, speaker, and optional IC amplifier chip have not been described in any particular detail because such details are well-known in the art. For example, U.S. Pat. Nos. 4,809,335, 4,970,659 and 5,075,970, all of which are incorporated herein by reference, disclose typical circuitry for performing the types of sound storage, selection and retrieval functions described above.

The eyewear 10 is preferably constructed so that all of the sound and light features are integrated into frame 12 so as to create the appearance of a single unitary object. The housing 44 can be integrally formed with the frame 12 as a single molded plastic piece. Alternatively, the housing 44 and frame 12 can be formed separately and attached together by glue or the like.

Although the present invention has been described with respect to sound and light emitting features attached to eyewear, these features may be employed in other forms of face apparel such as face masks. If these features were incorporated into similar-type apparel, the speaker would still be disposed on the apparel so as to project the sound outward from a central region of the user's face.

In sum, the novelty apparel described above provides unique entertainment features not normally associated with such apparel.

The present invention may be embodied in other specific forms without departing from the spirit or essential attributes thereof and, accordingly, reference should be made to the appended claims, rather than to the foregoing specification, as indicating the scope of the invention.

We claim:

1. A sound-emitting apparel to be worn on the face of a user, the apparel comprising:
   (a) means for storing and retrieving sound signals;
   (b) actuation means for selecting an individual sound signal, the selected sound signal being retrieved from the means for storing and retrieving upon selection thereof; and
   (c) speaker means disposed on the apparel so as to be located in a central region of the user's face upon wearing the apparel, the speaker means emitting the selected sound signal outward from the face apparel.

2. The apparatus of claim 1, wherein the apparel is eyewear having a frame, bridge region, lenses and temples, the bridge region being located in the central region of the user's face.

3. The apparatus of claim 2, wherein the speaker means is located in the bridge region.

4. The apparatus of claim 3, wherein the means for storing and retrieving sound signals and the actuation means are attached to the frame.

5. The apparatus of claim 1, wherein the means for storing and retrieving sound signals comprises first chip means for storing and retrieving speech-synthesized sounds and second chip means for storing and retrieving music sounds.

6. The apparatus of claim 5, further comprising at least one light for blinking at a preselected rate during actuation of the music sounds.

7. The apparatus of claim 5, wherein the first and second chip means are formed on a single chip.

8. The apparatus of claim 1, wherein the sound signals include music and speech sounds, the means for storing and retrieving sound signals stores and retrieves the music and speech sounds.

9. The apparatus of claim 8, wherein the actuation means comprises a plurality of selection buttons for selecting the music and speech sound signals, the selection buttons being of one of three types, depression of the first type causing first music sounds to play for a preselected time period, depression of the second type causing speech sounds to play for a preselected time period, and depression of the third type causing second music sounds to play continuously, a subsequent depression of the third type causing the second music sounds to stop playing.

10. Sound-emitting eyewear comprising:
    (a) an eyewear frame;
    (b) two temples attached to either sides of the frame;
    (c) a bridge region;
    (d) means for storing and retrieving sound signals, the means for storing and retrieving being attached to the frame;
    (e) actuation means attached to the frame for selecting an individual sound signal, the selected sound signal being retrieved from the means for storing and retrieving upon selection thereof; and
    (f) speaker means attached to the bridge region for emitting the selected sound signal outward from the eyewear.

11. The apparatus of claim 10, wherein the means for storing and retrieving sound signals comprises first chip means for storing and retrieving speech-synthesized sounds and second chip means for storing and retrieving music sounds.

12. The apparatus of claim 11, further comprising at least one light for blinking at a preselected rate during actuation of the music sounds.

13. The apparatus of claim 11, wherein the first and second chip means are formed on a single chip.

14. The apparatus of claim 10, wherein the sound signals include music and speech sounds, the means for storing and retrieving sound signals stores and retrieves the music and speech sounds.

15. The apparatus of claim 14, wherein the actuation means comprises a plurality of selection buttons for selecting the music and speech sound signals, the selection buttons being of one of three types, depression of the first type causing first music sounds to play for a preselected time period, depression of the second type causing speech sounds to play for a preselected time period, and depression of the third type causing second music sounds to play continuously, a subsequent depression of the third type causing the second music sounds to stop playing.

16. A sound-emitting apparel to be worn on the face of a user, the apparel comprising:
    (a) means for storing and retrieving at least one sound signal;
    (b) actuation means for selecting a sound signal and retrieving the sound signal from the means for storing and retrieving upon selection thereof; and
    (c) speaker means disposed on the apparel so as to be located in a central region of the user's face upon wearing the apparel, the speaker means emitting the sound signal outward from the face apparel.

17. Sound-emitting eyewear comprising:
    (a) an eyewear frame;
    (b) two temples attached to either sides of the frame;
    (c) a bridge region;
    (d) means for storing and retrieving at least one sound signal, the means for storing and retrieving being attached to the frame;
    (e) actuation means attached to the frame for selecting a sound signal and retrieving the sound signal from the means for storing and retrieving upon selection thereof; and
    (f) speaker means attached to the bridge region for emitting the sound signal outward from the eyewear.

* * * * *